United States Patent
Smith et al.

(10) Patent No.: US 9,008,920 B1
(45) Date of Patent: Apr. 14, 2015

(54) BALER AUTOMATIC STOPPING SEQUENCE

(71) Applicant: CNH America LLC, New Holland, PA (US)

(72) Inventors: Kevin M. Smith, Narvon, PA (US); Carl M. Brewer, Ephrata, PA (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/097,780

(22) Filed: Dec. 5, 2013

(51) Int. Cl.
| | |
|---|---|
| *A01F 15/07* | (2006.01) |
| *B30B 9/30* | (2006.01) |
| *A01F 15/08* | (2006.01) |
| *B60W 10/18* | (2012.01) |
| *B60W 10/30* | (2006.01) |
| *B60W 30/18* | (2012.01) |
| *F16H 61/70* | (2006.01) |

(52) U.S. Cl.
  CPC ............... *A01F 15/08* (2013.01); *A01F 15/07* (2013.01); *B60W 10/18* (2013.01); *B60W 10/30* (2013.01); *B60W 30/18109* (2013.01); *A01F 15/071* (2013.01); *A01F 15/0841* (2013.01); *F16H 61/70* (2013.01); *A01F 2015/076* (2013.01)

(58) Field of Classification Search
  CPC . A01F 15/07; A01F 15/071; A01F 2015/076; A01F 15/08; A01F 15/0841; F16H 61/70
  USPC ........ 701/50; 53/52, 211, 216, 537, 580, 587; 56/10.2 G, 14.7, 14.9, 15.6
  See application file for complete search history.

(56) References Cited

U.S. PATENT DOCUMENTS

| | | | | |
|---|---|---|---|---|
| 5,189,866 | A  * | 3/1993 | Krutza ............................ | 53/587 |
| 6,708,478 | B1 | 3/2004 | Mesmer et al. | |
| 7,404,355 | B2 | 7/2008 | Viaud et al. | |
| 7,937,923 | B2 | 5/2011 | Biziorek | |
| 8,230,663 | B2 * | 7/2012 | Viaud ............................ | 53/116 |
| 8,311,709 | B2 * | 11/2012 | Vanhercke et al. ............. | 701/50 |
| 8,527,156 | B2 * | 9/2013 | Martin et al. ................... | 701/50 |
| 8,577,563 | B2 * | 11/2013 | Smith et al. .................... | 701/50 |
| 2001/0047640 | A1 | 12/2001 | Schaefer | |
| 2001/0056544 | A1 | 12/2001 | Walker | |
| 2002/0029542 | A1 | 3/2002 | Davis et al. | |
| 2010/0089013 | A1* | 4/2010 | McClure et al. ................ | 53/587 |
| 2011/0023732 | A1* | 2/2011 | Herron ............................ | 100/40 |
| 2011/0112729 | A1 | 5/2011 | Martin et al. | |
| 2011/0238269 | A1 | 9/2011 | Martin et al. | |
| 2013/0116895 | A1 | 5/2013 | Smith et al. | |

FOREIGN PATENT DOCUMENTS

WO    WO2012143389    10/2012

* cited by examiner

*Primary Examiner* — Russell Frejd
(74) *Attorney, Agent, or Firm* — Rebecca L. Henkel (57) ABSTRACT

A system is provided that automatically stops a tractor as a function of a status of a round baler. This may include a controller such as a baler controller directly or indirectly detecting initial movement of an actuator that moves a wrapper assembly. Based on this detection, conditions for starting a wrap procedure may be determined either by actuator position or by a time period required for moving the wrapper assembly from a home position to a wrap start position. A time period required to bring the tractor to stop may be determined and compared with the time period required for the wrapper assembly to move from the home position to the wrap start position. The baler controller may send a tractor halt command signal for stopping the tractor to coordinate and synchronize bringing the tractor to a complete stop at the same time that the wrapping material is inserted and applied onto the bale at the beginning of a wrapping procedure.

20 Claims, 4 Drawing Sheets

BALER AUTOMATIC STOPPING SEQUENCE

FIELD OF THE INVENTION

The invention relates generally to the agricultural hay and forage equipment such as balers and, in particular, to round balers.

BACKGROUND OF THE INVENTION

Modern farming practices strive to minimize operating expenses and improve working conditions of equipment operators. Improving efficiency of agricultural implements can help reduce operating expenses and reduce manual workload responsibility of equipment operators. To improve efficiency of agricultural implements, various tasks that were manually performed by equipment operators have been automated and synchronized. To improve efficiency while baling crop material such as hay or other forage, efforts have been made to automate and synchronize tractor stopping with bale wrapping procedures while making cylindrical bales, commonly referred to as round bales, with round balers. It is known to automatically slow a tractor based on a monitored bale size, begin stopping a tractor based on a status of whether wrapping material has moved onto the bale, and begin wrapping the bale after the tractor has stopped. It is also known to provide for operator interaction, for example, to allow the operator to initiate a stop sequence of the tractor after a bale has achieved a target bale size.

SUMMARY OF THE INVENTION

The present invention is directed to a system for coordinating stopping a tractor for wrapping a wrapping material onto a round bale of crop material such as hay or other forage with a round baler. The system automatically controls a tractor to slow and stop the tractor as a function of a status of a baler. Such status of the baler may include a movement initiation event of a wrapper assembly, a position of the wrapper assembly, and/or how long it may take for the wrapper assembly to move from a home position to a wrap start position. This may allow for a relatively simple system to ensure synchronization of tractor stopping with starting bale wrapping, while minimizing delay between stopping of the tractor and beginning the wrapping procedure.

The system may reduce operator fatigue by automatically stopping the tractor and may improve productivity by ensuring the tractor stops at the same time as a wrapper assembly gets to a start position for applying wrapping material onto a round bale when the tractor initially stops, while preventing crop material from being bound outside of the wrapping.

According to one aspect of the invention, initiation of movement of an actuator that moves the wrapper assembly is detected. Based on this detection, a timer may be started and a time period required for moving the wrapper assembly from the home position to the wrap start position may be determined. A time period required to bring the tractor to stop may be determined and compared with the time period required for the wrapper assembly to move from the home position to the wrap start position. A signal(s) corresponding to a halt command may be sent to the tractor based on this comparison to coordinate and synchronize bringing the tractor to a complete stop at the same time that the wrapping material is inserted and applied onto the bale at the beginning of the wrapping procedure. By beginning the wrapping procedure when the tractor achieves a complete stop, it is less likely that crop material will be moved outside of the bale during wrapping, preventing crop material from being bound outside of the wrapping.

According to another aspect of the invention, a method is provided for coordinating stopping a tractor with wrapping a bale in a baler. The method may include driving a tractor to move a baler with respect to a windrow of cut crop material for picking up the cut crop material with the baler. A wrapper assembly is moved from a home position at which the wrapper assembly is arranged with respect to the bale chamber to allow the forming of the bale within the bale chamber to a start wrap position at which the wrapper assembly is arranged with respect to the bale chamber to allow a wrapping material carried by the wrapper assembly to be applied to the bale during a bale wrapping procedure. Movement of the wrapper assembly from the home position toward the start wrap position is detected. A timer is started at a time ($T_{actuator\ start}$) corresponding to a time of detected movement of the wrapper assembly from the home position toward the start wrap position. A first time period value ($T_{until\ stop}$) is determined that corresponds to an amount of time required for the tractor and baler to come to a stop as a function of at least one of a tractor speed, an operator setting, and a wrapper type. A second time period value ($T_{until\ wrap}$) is determined that corresponds to an amount of time that will elapse before a beginning of the bale wrapping procedure based at least in part on a value of $T_{actuator\ start}$. The time period $T_{until\ stop}$ is evaluated with respect to $T_{until\ wrap}$. The tractor is stopped based at least in part on the evaluation of $T_{until\ stop}$ with respect to $T_{until\ wrap}$. A time ($T_{stopped}$) is defined at which the tractor is completely stopped, for example, initially achieves the complete stop. The wrapper procedure begins at a time ($T_{wrapping\ start}$) that occurs substantially simultaneously with time $T_{stopped}$. This may provide an automatic stopping sequence for coordinating stopping a tractor with wrapping of a round bale.

According to another aspect of the invention, the tractor includes a tractor controller configured for controlling travel speed related operations of the tractor and the baler includes a baler controller configured for controlling bale forming and wrapping related operations. The baler controller may send a tractor halt command signal to the tractor controller for stopping the tractor. The baler controller may send the tractor halt command signal when the $T_{until\ stop}$ time period value is greater than the $T_{until\ wrap}$ time period value. The baler controller starts the timer at time $T_{actuator\ start}$. The baler controller or the tractor controller may determine the $T_{until\ stop}$ time period value. The tractor controller may communicate the determined $T_{until\ stop}$ time period value to the baler controller. The tractor controller may determine the $T_{until\ stop}$ time period value based at least in part on a stored lookup table configured to be accessible by the tractor controller or based at least in part on a calculated estimate of time remaining before reaching a complete stop. A wrapped bale may be ejected from the baler and a resume travel command signal is sent from the baler controller to the tractor controller. The resume travel command signal may be confirmed by way of an operator input before resuming travel. This may allow for a relatively simple system for automated baling.

According to another aspect of the invention, the wrapper assembly includes an electronic actuator. Detecting movement of the wrapper assembly from the home position toward the start wrap position may include monitoring electrical current draw of the actuator. This may include detecting when the actuator has been energized for moving the wrapper assembly. A change in electrical current draw of the actuator may be detected for indicating energizing the actuator. The baler controller may detect the change in the electrical current draw of the actuator. The electrical current draw of the actuator may be directly monitored by detecting current with a current sensor or may be indirectly monitored by way of other sensors or, for example, detecting voltage and/or resistance across the actuator. This may allow for a relatively simple system for automatically stopping a tractor as a function of baler status.

According to another aspect of the invention, a baler is provided that includes a chassis configured for towing behind a tractor. A pickup is supported by the chassis and arranged for alignment with a windrow of crop material for delivering the crop material into the baler. A bale chamber is arranged with respect to the chassis and the pickup to receive the crop material delivered by the pickup for forming a bale within the bale chamber. A wrapper assembly carries a wrapping material and is arranged with respect to the bale chamber to allow the wrapping material to be applied to the bale during a bale wrapping procedure. The wrapper assembly includes a cam configured for moving from a first position corresponding to a home position of the wrapper assembly at which the wrapper assembly is arranged with respect to the bale chamber to allow the forming of the bale within the bale chamber to a second position corresponding to a start wrap position at which the wrapper assembly is arranged with respect to the bale chamber to allow the wrapping material to be applied to the bale during a bale wrapping procedure. An actuator is configured for moving the cam between the first and second positions to move the wrapper assembly from the home position to the start wrap position. A baler controller of the baler is configured for controlling bale forming and wrapping related operations of the baler. The controller can communicate with a tractor controller of the tractor that can control travel speed related operations of the tractor. The baler controller is configured for detecting movement of the actuator while the actuator begins moving the cam from the first position toward the second position by detecting energizing of the actuator. The baler controller sends a tractor halt command signal to the tractor controller based at least in part on detecting energizing of the actuator. This may allow for a relatively simple system for automatically stopping a tractor, for example, by way of a baler controller as a function of baler status.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
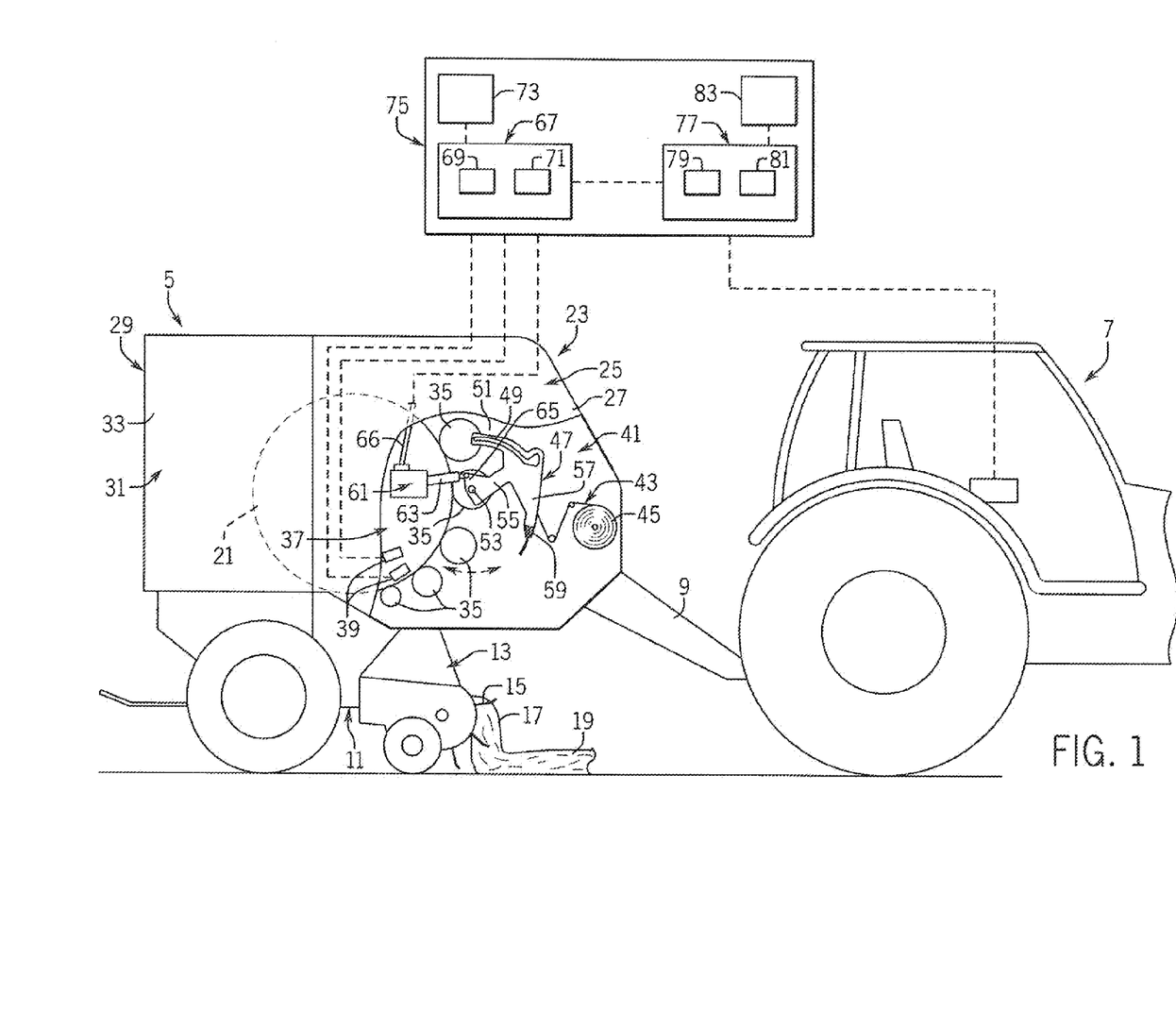
FIG. 1 is a simplified partially schematic side elevation of a tractor and a round baler.

Referring now to the drawings and specifically to FIG. 1, an agricultural implement, namely, a baler, is shown as a round baler 5 that is towed behind a tractor 7 by way of a hitch 9 extending from a chassis 11 of the baler 5. The baler 5 may be any of a variety of round balers configured for automatic baling, for example, one of the RB 4 series of round balers, such as an RB444, RB454, RB464, RB554, or RB564 round baler available from Case IH. Toward a front end the baler 5, a pickup 13 extends downwardly from the chassis 11. The pickup 13 has tines 15 that rotate to collect cut crop material 17 from a windrow 19 for delivery into a bale chamber 21. The bale chamber 21 is provided in an enclosure 23 defined by a front portion 25 having interconnected walls 27. Toward a back end of the baler 5, a back portion 29 of the enclosure 23 defines a tailgate 31 having interconnected walls 33 and that is arranged with respect to the front portion 25 of the enclosure 23 to pivot and raise open for ejecting a bale from the baler 5. Inside the enclosure 23, a series of belts (not shown) is supported for traveling along a path that partially defines the bale chamber 21, such as at a rear-facing portion of the bale chamber 21, to accommodate rolling of the bale while controlling the cylindrical bale shape as the bale grows within the bale chamber 21. Multiple rollers 35 are arranged at a forward facing portion of the bale chamber 21. The rollers 35 may include, for example, a powered floor roll to support the weight of the bale as it is being formed, a starter roll for beginning bale formation in working with the belts to grow the bale shape, a fixed roll to assist with core formation of the bale, and pivot and ribbed stripper rolls to assist with bale formation and maintaining bale shape. During bale formation, a size(s) of a bale 37 may be detected by one or more bale size sensors 39 arranged with respect to the bale chamber 21 for sensing the size of the bale 37 during its formation.

Figure 2:
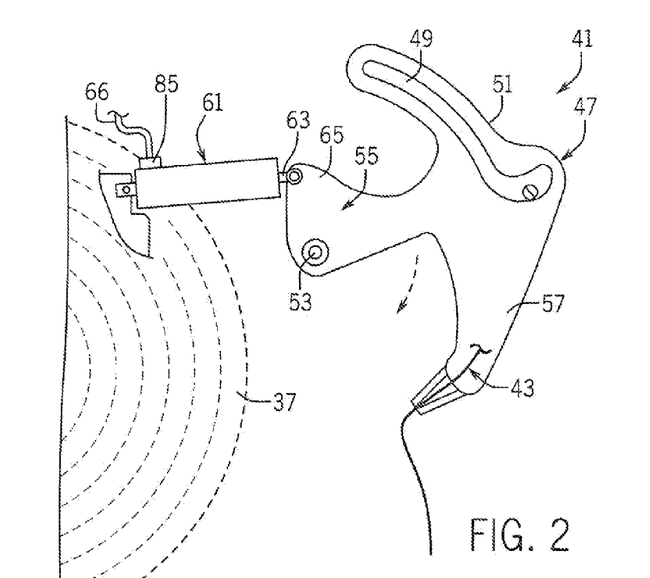
FIG. 2 is a simplified partially schematic side elevation of a wrapper assembly of the baler of FIG. 1 in a home position.
Figure 3:
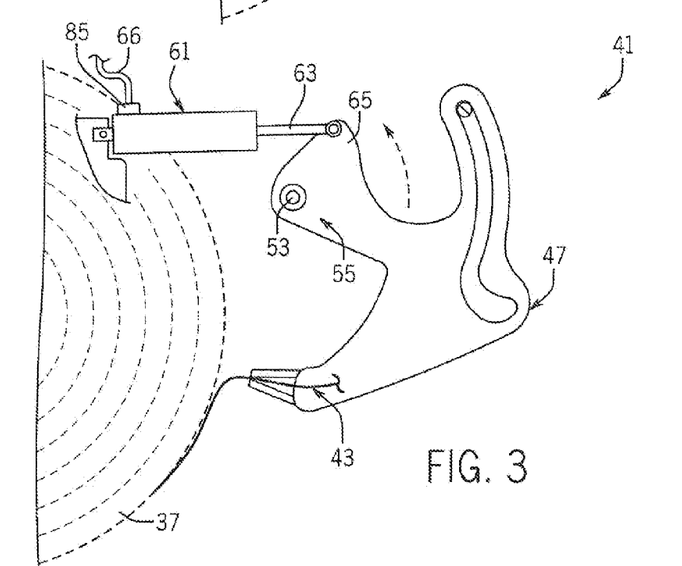
FIG. 3 is a simplified partially schematic side elevation of a wrapper assembly of the baler of FIG. 1 in a start wrap position.

Still referring to FIG. 1, a wrapper assembly 41 is arranged within the enclosure 23 for providing wrapping material 43 onto fully formed bales 37. The wrapping material 43 is stored on a roll 45 toward the front of the enclosure 23. The wrapping material 43 may be a net or mesh type of material. A cam 47 is used for inserting and applying the wrapping material 43 onto the bale 41 when the bale 37 has achieved full size. Referring now to FIGS. 2 and 3, the cam 47 has a slot 49 in a first arm 51 that guides movement to the cam 47 to pivot about a pivot point 53 defined at a base 55 of the cam 47. A second arm 57 extends from the base 55 in a generally opposite direction with respect to the first arm 51. A duckbill clamp 59 is arranged at an end of the second arm 57. The duckbill clamp 59 is configured to allow one-way travel of the wrapping material 43 through the wrapper assembly 41. The duckbill clamp 59 holds a portion of the wrapping material 43 exposed for insertion into the bale chamber 21 and application of the wrapping material 43 onto the bale 37 during a bale wrapping procedure that occurs when the bale 37 is fully formed and thus full size. An actuator 61 is arranged within the enclosure 23 for moving the cam 47 from a home position (FIG. 2) to a start wrap position (FIG. 3), as explained in greater detail elsewhere herein. In one embodiment, the actuator 61 is an electronic actuator such as an electronic linear actuator that has a movable rod 63 that is connected to a lobe 65 at the base 55 of the cam 47 for pivoting the cam 47 about the pivot 53.

Referring now to FIG. 2, the wrapper assembly 41 and its cam 47 are shown in the home position. When in the home position, the wrapper assembly 41 is arranged with respect to the bale chamber 21 (FIG. 1) to allow the forming of the bale 37 within the bale chamber 21, with the duckbill clamp 59 in a position that is relatively further from the bale 37. Referring now to FIG. 3, the wrapper assembly 41 and its cam 47 are shown in the start wrap position. When in the start wrap position, the wrapper assembly 41 is arranged with respect to the bale chamber 21 (FIG. 1) to allow the wrapping material 43 carried by the wrapper assembly 41 to be applied to the bale 37 during a bale wrapping procedure, with the duckbill clamp 59 in a position that is relatively closer to the bale 37. Referring again to FIGS. 2 and 3, to move the wrapper assembly 41 and its cam 47 from the home position (FIG. 2) to a start wrap position (FIG. 3), the actuator 61 is energized. Energizing actuator 61 extends the rod 63 from a fully retracted position when the wrapper assembly 41 is in the home position (FIG. 2), outwardly. Extending the rod 63 pushes an end of the run 63 against the lobe 65 of the cam 47. This causes the cam 47 to pivot about the pivot 53, moving the duckbill clamp 59 and the wrapping material 43 closer to the bale 37. When the rod 63 moves outwardly to a fully extended position (FIG. 3), the wrapper assembly 41 and its cam 47 correspondingly move to a location defining the start wrap position.

Referring now to FIGS. 1-3, a conductor 66 operably connects the actuator 61 to a baler controller 67 for controlling operation of the actuator 61. Referring now to FIG. 1, the baler controller 67 is configured for controlling operations of the baler 5, including controlling bale forming and wrapping related operations of the baler 5. The baler controller 67 includes a controller 69 and power supply 71, as is known in automatic round balers, for controlling the functions of the baler 5 by controlling the various electronic actuators, hydraulic systems, and/or other systems of the baler 5. The controller 69 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the baler 5. A baler interface system 73 is operably connected to the baler controller 67 and includes a monitor and various input devices to allow an operator to see the statuses and control various operations of the baler 5, for example, from within a cab of the tractor 7. The baler interface system 73 may be a Deluxe Control Monitor™ interface available for use with RB 4 series of round balers from Case IH.

Still referring to FIG. 1, the baler controller 67 is part of a control system 75 that includes a tractor controller 77 operably communicating with the baler controller 67, for example, by way of an ISOBUS connection, for coordinating controls of the baler and tractor 5, 7. The tractor controller 77 is configured for controlling operations of the tractor 7 such as controlling travel speed related operations of the tractor 7, including controlling speed, braking, shifting, and other operations of the tractor 7. The tractor controller 77 includes a controller 79 and power supply 81, as is known, for controlling the functions of the tractor 7 by controlling the various transmission, engine, hydraulic, and/or other systems of the tractor 7. Like the controller 69 of the baler controller 67, the controller 79 of the tractor controller 77 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the tractor 7. A tractor interface system 83 is operably connected to the tractor controller 77 and includes a monitor and various input devices to allow an operator to see the statuses and control various operations of the tractor 7 from within the cab of the tractor 7. The tractor interface system 83 may be a MultiControl Armrest™ console available for use with Maxxum™ series tractors from Case IH.

Still referring to FIG. 1, the control system 75 is configured so that the baler and tractor controllers 67, 77 cooperate to automatically control the tractor 7 to slow and stop the tractor 7 as a function of a status of a baler 5. Such status of the baler 5 may include such characteristics as a movement initiation event of the wrapper assembly 41, a position of the wrapper assembly 41, and/or how long it may take for the wrapper assembly 41 to move from the home position to the wrap start position. Referring again to FIGS. 2 and 3, a sensor(s) 85 is arranged for detecting movement of the wrapper assembly 41 to allow the control system 75 to coordinate and synchronize slowing and stopping of the tractor 7 with the wrapper assembly 41, reaching the wrap start position. In one embodiment, the sensor 85 is arranged with respect to the actuator 61 and/or conductor 66 for monitoring electrical current draw of and thus energizing of the actuator 61. The sensor 85 may be a current sensor to directly detect and monitor current draw of the actuator 61 or may be another sensor configured to detect, for example, voltage and resistance across the actuator 61 for indirectly monitoring current draw actuator 61. Other ways of detecting movement of the wrapper assembly 41 may include using yet another type of sensor(s) 85, such as potentiometers, hall effect and on/off sensors such as limit switches, magnetic, ultrasonic and infrared sensors operatively connected to the control system 75 for detecting such movement(s). In one embodiment, energizing or initiation of movement of the actuator 61 is detected by the control system 75. Based on this detection of movement initiation of the actuator 61 and the time period required to move the wrapper assembly from the home position to the wrap start position, the control system 75 controls the speed of the tractor 7 to coordinate and synchronize bringing the tractor 7 to a complete stop at the same time that the wrapper assembly 41 reaches the wrap start position.

Figure 4:
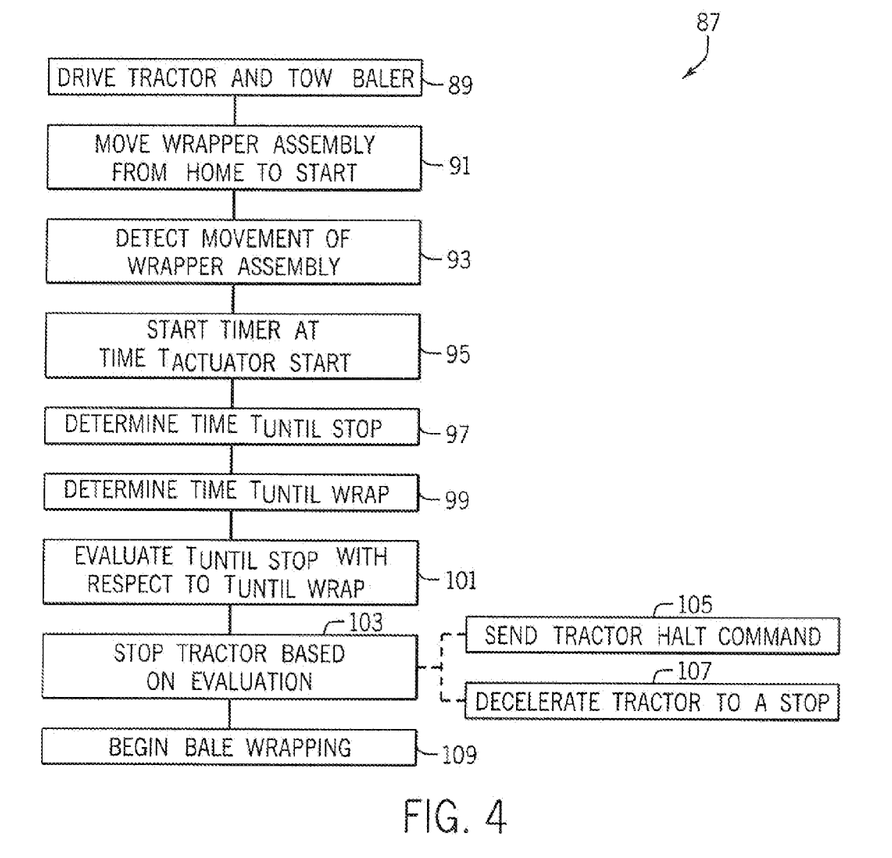
FIG. 4 illustrates a schematic representation of a method for coordinating stopping a tractor with wrapping a bale in a baler.

Referring now to FIG. 4 and with further reference to FIG. 1, an exemplary method for coordinating automatically stopping a tractor with wrapping a bale in a baler is shown as represented by numeral 87. As represented at blocks 89 and 91, a tractor 7 is driven to tow a baler 5 while aligning the baler 5 with respect to a windrow 19 of cut crop material 17 for automatically forming a bale 37 with the baler 5. When the baler controller 67 detects that the bale 37 has achieved full size, the baler controller 67 commands movement of the wrapper assembly 41 from a home position (FIG. 2) to a start wrap position (FIG. 3). As represented at block 93, movement of the wrapper assembly from the home position toward the start wrap position is detected. This may be done by way of sensor 85 that detects current draw of the actuator 61 and sends a corresponding signal(s) that is monitored and evaluated by the baler controller 67, which may be indicative of initiation of movement of the wrapper assembly 41.

Still referring to FIG. 4 with further reference to FIG. 1, as represented at block 95, the control system 75, such as the baler controller 67, starts a timer at a time ($T_{actuator\ start}$) corresponding to a time of detected movement of the wrapper assembly 41 from the home position toward the start wrap position. As represented at block 97, the control system 75, such as the tractor controller 77, determines a first time period value ($T_{until\ stop}$) that corresponds to an amount of time required for the tractor 7 and baler 5 to come to a stop. The $T_{until\ stop}$ value can be determined as a function of at least one of a tractor speed and an operator setting such as a maximum deceleration rate defined by the operator, for example, through the tractor interface system 83. The $T_{until\ stop}$ value can be determined by the baler controller 67 or the tractor controller 77 and communicated back to the baler controller 67. The $T_{until\ stop}$ value can be determined based on a stored lookup table configured to be accessible by the baler controller 67 or tractor controller 77, or based at least in part on a calculated estimate by the control system 75 of time remaining before reaching a complete stop. As represented at block 99, a second time period value ($T_{until\ wrap}$) is determined that corresponds to an amount of time that will elapse before a beginning of the bale wrapping procedure, at which time the wrapping material 43 begins engaging and wrapping onto the bale 37. The $T_{until\ wrap}$ value is determined based at least in part on a value of $T_{actuator\ start}$ value and a known or estimated time required for moving the wrapper assembly 41 from the home position to the start wrap position. The $T_{until\ wrap}$ value can be determined based on a stored lookup table configured to be accessible by the baler controller 67, or based at least in part on a calculation of the time duration for moving the wrapper assembly 41 from the home position to the start wrap position, which may be based at least in part on a wrapper type or other characteristic of the wrapping material 43.

Still referring to FIG. 4 with further reference to FIG. 1, as represented at block 101, the control system 75 evaluates the values of $T_{until\ stop}$ and $T_{until\ wrap}$ with respect to each other. This may be done by way of the baler controller 67. As represented at block 103, the control system 75 stops the tractor 7 based at least in part on the evaluation of the of $T_{until\ stop}$ and $T_{until\ wrap}$ values. As represented at blocks 105 and 107, a tractor halt command signal is sent to the tractor 7 to decelerate the tractor 7 to be stopped. This may be done by the baler controller 67 sending the tractor halt command signal to the tractor controller 77 that executes the deceleration and stopping of the tractor 7. As represented at block 109, a bale wrapping procedure begins at a time $T_{wrapping\ start}$ that occurs substantially simultaneously, for example, within less than about five seconds or less than about one second of, a time $T_{stopped}$. The time $T_{stopped}$ is defined when the tractor is completely stopped, for example, initially achieves the complete stop.

Figure 5:
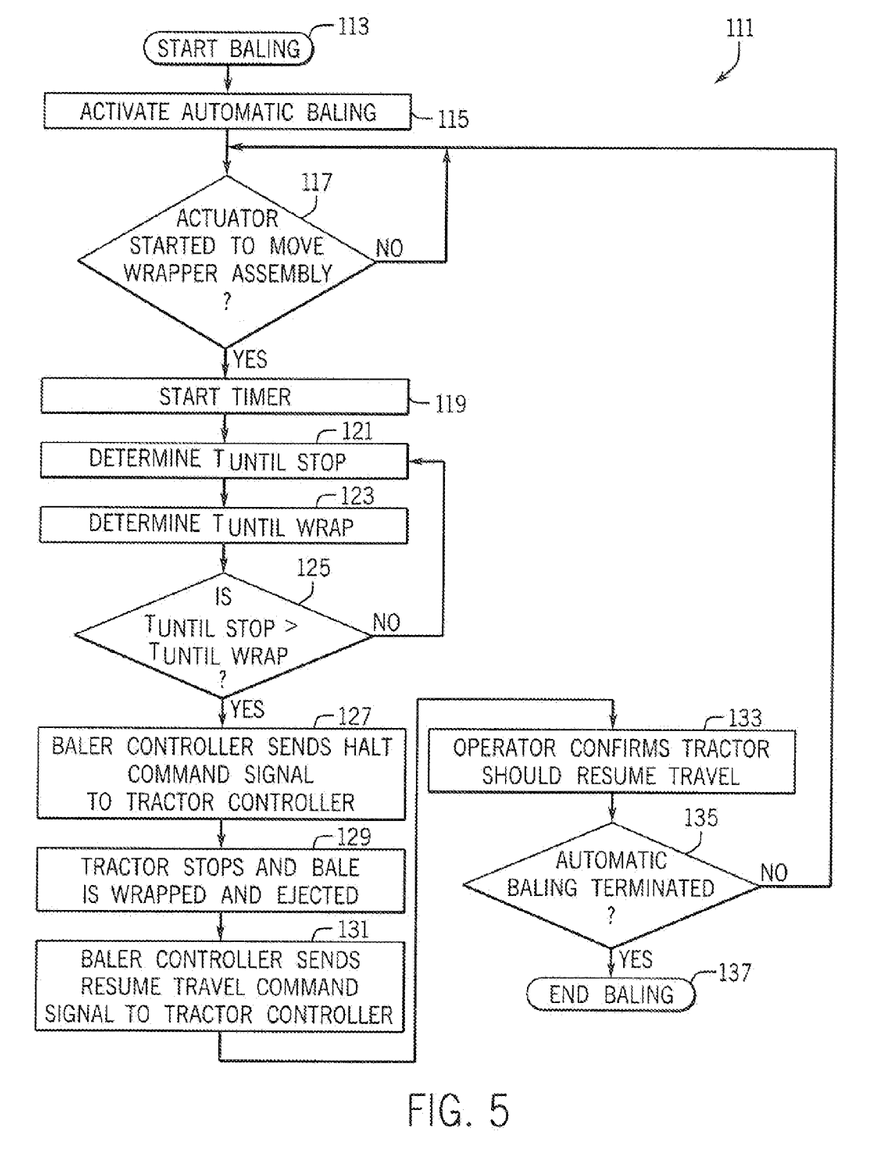
FIG. 5 illustrates a flowchart of a variant of the method of FIG. 4.

Referring now to FIG. 5 and with further reference to FIGS. 1 and 4, a flowchart of one embodiment of a method for coordinating automatically stopping a tractor with wrapping a bale in a baler by way of control system 75 is shown as represented by numeral 111. At step 113, baling starts, for example, as described with respect to block 89 of FIG. 4. At step 115, the operator activates an automatic baling procedure of the baler 5, by way of the baler interface system 73 (FIG. 1). At step 117, a determination is made whether the wrapper assembly 41, has begun moving from the home position to the wrap start position, for example, as described with respect to block 93 of FIG. 4. At step 119, detecting the initiation of the movement of the wrapper assembly 41 from the home position to the wrap start position causes a start timer to begin, for example, as described with respect to block 95 of FIG. 4. At steps 121 and 123, the times value of $T_{until\ stop}$ op and $T_{until\ wrap}$ are determined, for example, as described with respect to blocks 97 and 99 of FIG. 4. At step 125, the values of $T_{until\ stop}$ and $T_{until\ wrap}$ are compared with each other. If the value of $T_{until\ stop}$ is less than $T_{until\ wrap}$, then new values of $T_{until\ stop}$ and $T_{until\ wrap}$ are determined at that time by repeating steps 121 and 123, along with comparisons of such new values of $T_{until\ stop}$ and $T_{until\ wrap}$ until the value of $T_{until\ stop}$ is greater than the value of $T_{until\ wrap}$. At that point, at step 127, the baler controller 67 sends a tractor halt command signal to the tractor controller 77, for example, as described with respect to blocks 103 and 105 of FIG. 4. In one embodiment, the tractor 7 may be stopped when $T_{until\ stop}$ is equal or nearly equal to but slightly less than $T_{until\ wrap}$, such that the difference between $T_{until\ stop}$ and $T_{until\ wrap}$ is small enough to allow a bale wrapping procedure to begin substantially simultaneously with the stopping of the tractor 7, for example, within less than about five seconds or less than about one second of each other. At step 129, the tractor 7 stops and the bale is wrapped, for example, as described with respect to blocks 107 and 109 of FIG. 4, and the bale is ejected from the baler 5. At step 131, the baler controller 67 sends a resume travel command signal to the tractor controller 77. This is indicated to the operator through the baler or tractor interface systems 73, 83 (FIG. 1) and the operator confirms through the baler or tractor interface system 73, 83 that the tractor 7 should resume travel. At step 135, automatic baling can resume, for example, as permitted by the operator to the baler interface system 73, at which point the control system 75 returns to step 117 to determine whether the wrapper assembly 41, has begun moving from the home position to the wrap start position. If automatic baling does not resume at step 135, and the automatic baling is terminated and the baling session ends at step 137.

Many changes and modifications could be made to the invention without departing from the spirit thereof. The scope of these changes will become apparent from the appended claims.

We claim:

1. A method for coordinating stopping a tractor with wrapping a bale in a baler while operating a tractor to move a baler with respect to a windrow of cut crop material for picking up the cut crop material with the baler, the method comprising:

moving a wrapper assembly from a home position at which the wrapper assembly is arranged with respect to the bale chamber to allow the forming of the bale within the bale chamber to a start wrap position at which the wrapper assembly is arranged with respect to the bale chamber to allow a wrapping material carried by the wrapper assembly to be applied to the bale during a bale wrapping procedure;

detecting movement of the wrapper assembly from the home position toward the start wrap position;

starting a timer at a time ($T_{actuator\ start}$) corresponding to a time of detected movement of the wrapper assembly from the home position toward the start wrap position;

determining a first time period value ($T_{until\ stop}$) corresponding to an amount of time required for the tractor and baler to come to a stop as a function of at least one of a tractor speed and an operator setting;

determining a second time period value ($T_{until\ wrap}$) corresponding to an amount of time that will elapse before a beginning of the bale wrapping procedure based at least in part on a value of $T_{actuator\ start}$;

evaluating $T_{until\ stop}$ with respect to $T_{until\ wrap}$;

stopping the tractor based at least in part on the evaluation of $T_{until\ stop}$ with respect to $T_{until\ wrap}$ to define a time ($T_{stopped}$) at which the tractor is completely stopped; and beginning the bale wrapping procedure at a time ($T_{wrapping\ start}$) occurring substantially simultaneously with time $T_{stopped}$.

2. The method of claim 1, wherein the tractor includes a tractor controller configured for controlling travel speed related operations of the tractor and the baler includes a baler controller configured for controlling bale forming and wrapping related operations.

3. The method of claim 2, wherein the baler controller sends a tractor halt command signal to the tractor controller for stopping the tractor.

4. The method of claim 3, wherein the baler controller sends a tractor halt command signal when the $T_{until\ stop}$ time period value is greater than the $T_{until\ wrap}$ time period value.

5. The method of claim 3, wherein the tractor halt command signal is sent when the $T_{until\ stop}$ time period value is equal to or less than the $T_{until\ wrap}$ time period value.

6. The method of claim 3, wherein the baler controller starts the timer at time $T_{actuator\ start}$.

7. The method of claim 3, wherein at least one of the baler controller and the tractor controller determines the $T_{until\ stop}$ time period value.

8. The method of claim 7, wherein the tractor controller communicates the determined $T_{until\ stop}$ time period value to the baler controller.

9. The method of claim 7, wherein the tractor controller determines the determined $T_{until\ stop}$ time period value based at least in part on a stored lookup table configured to be accessible by the tractor controller.

10. The method of claim 7, wherein the tractor controller determines the $T_{until\ stop}$ time period value based at least in part on a calculated estimate of time remaining before reaching a complete stop.

11. The method of claim 1, wherein at least one of a potentiometer, hall effect sensor, limit switch, magnetic switch, infrared sensor, and ultrasonic sensor is used for detecting movement of the wrapper assembly.

12. The method of claim 1, wherein the wrapper assembly includes an electronic actuator and wherein the detecting movement of the wrapper assembly from the home position toward the start wrap position includes monitoring electrical current draw of the actuator.

13. The method of claim 12, wherein the tractor includes a tractor controller configured for controlling travel speed-related operations of the tractor and the baler includes a baler controller configured for controlling bale forming and wrapping-related operations and wherein monitoring the electrical current draw of the actuator includes detecting a change in an electrical current draw of the actuator with the baler controller indicating energizing the actuator for moving the wrapper assembly.

14. A method for coordinating stopping a tractor with wrapping a bale in a baler while operating a tractor to move a baler with respect to a windrow of cut crop material for picking up the cut crop material with the baler, wherein the tractor includes a tractor controller configured for controlling travel speed-related operations of the tractor and the baler includes a baler controller configured for controlling bale forming and wrapping-related operations, the method comprising:

moving a wrapper assembly from a home position at which the wrapper assembly is arranged with respect to the bale chamber to allow the forming of the bale within the bale chamber to a start wrap position at which the wrapper assembly is arranged with respect to the bale chamber to allow a wrapping material carried by the wrapper assembly to be applied to the bale during a bale wrapping procedure;

detecting movement of the wrapper assembly from the home position toward the start wrap position;

starting a timer at a time ($T_{actuator\ start}$) corresponding to a time of detected movement of the wrapper assembly from the home position toward the start wrap position for evaluating a time elapsed since $T_{actuator\ start}$;

determining a first time period value ($T_{until\ stop}$) corresponding to an amount of time required for the tractor and baler to come to a stop as a function of at least one of a tractor speed, an operator setting, and a wrapper type;

determining a second time period value ($T_{until\ wrap}$) corresponding to an amount of time that will elapse before a beginning of the bale wrapping procedure based at least in part on a value of $T_{actuator\ start}$;

evaluating whether $T_{until\ stop}$ is greater than $T_{until\ wrap}$;

sending a tractor halt command signal from the baler controller to the tractor controller when $T_{until\ stop}$ is greater than $T_{until\ wrap}$; and decelerating the tractor to a stop with the tractor controller based on the halt command signal from the baler controller.

15. The method of claim 14, wherein the wrapper assembly includes an electronic actuator and wherein the detecting movement of the wrapper assembly from the home position toward the start wrap position includes monitoring electrical current draw of the actuator.

16. The method of claim 15, wherein monitoring the electrical current draw of the actuator includes detecting a change in an electrical current draw of the actuator indicating energizing the actuator for moving the wrapper assembly.

17. The method of claim 16, wherein the baler controller detects the change in the electrical current draw of the actuator.

18. A baler, comprising:

a chassis configured for towing behind a tractor;

a pickup supported by the chassis and arranged for alignment with a windrow of crop material for delivering the crop material into the baler;

a bale chamber arranged with respect to the chassis and the pickup to receive the crop material delivered by the pickup for forming a bale within the bale chamber;

a wrapper assembly carrying a wrapping material and arranged with respect to the bale chamber to allow the wrapping material to be applied to the bale during a bale wrapping procedure, the wrapper assembly including;

a cam configured for moving from a first position corresponding to a home position of the wrapper assembly at which the wrapper assembly is arranged with respect to the bale chamber to allow the forming of the bale within the bale chamber to a second position corresponding to a start wrap position at which the wrapper assembly is arranged with respect to the bale chamber to allow the wrapping material to be applied to the bale during a bale wrapping procedure, an actuator configured for moving the cam between the first and second positions to move the wrapper assembly from the home position to the start wrap position; and a baler controller configured for controlling bale forming and wrapping-related operations of the baler and configured to communicate with a tractor controller of the tractor configured for controlling travel speed-related operations of the tractor, and wherein the baler controller is configured for detecting movement of the actuator while the actuator begins moving the wrapper assembly from the first position toward the second position by detecting movement of the actuator and to send a tractor halt command signal to the tractor controller based at least in part on detecting movement of the actuator.

19. The baler of claim 18, wherein the baler controller is configured to start a timer at a time ($T_{actuator\ start}$) corresponding to a time of detected movement of the actuator and determine a time period value ($T_{until\ wrap}$) corresponding to an amount of time that will elapse before a beginning of the bale wrapping procedure based at least in part on a value of $T_{actuator\ start}$, and tractor halt command signal is sent based at least in part on the $T_{until\ wrap}$ time period value.

20. The baler of claim 19, wherein at least one of the baler controller and the tractor controller is configured to determine a time period value ($T_{until\ stop}$) corresponding to an amount of time required for the tractor and baler to come to a stop, and wherein the baler controller is configured to evaluate $T_{until\ stop}$ with respect to $T_{until\ wrap}$ and send the tractor command signal when $T_{until\ stop}$ is greater than $T_{until\ wrap}$ such that a wrapping procedure begins at a time ($T_{wrapping\ start}$) that occurs substantially simultaneously with a time ($T_{stopped}$) defined by the tractor and baler initially achieving a complete stop.

* * * * *